(12) United States Patent
Matsumoto et al.

(10) Patent No.: US 7,237,644 B2
(45) Date of Patent: Jul. 3, 2007

(54) VEHICLE CANISTER ARRANGING STRUCTURE

(75) Inventors: Hideki Matsumoto, Saitama (JP); Hiroto Inoue, Saitama (JP); Naomasa Kaneko, Saitama (JP); Junichi Orihara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 185 days.

(21) Appl. No.: 10/716,340

(22) Filed: Nov. 18, 2003

(65) Prior Publication Data

US 2004/0099465 A1 May 27, 2004

(30) Foreign Application Priority Data

Nov. 19, 2002 (JP) ............... 2002-335596

(51) Int. Cl.
  *B60K 15/01* (2006.01)
(52) U.S. Cl. ..................... 180/309; 180/69.4
(58) Field of Classification Search ........... 180/291, 180/296, 309, 69.4, 89.2
See application file for complete search history.

(56) References Cited

U.S. PATENT DOCUMENTS

| 4,727,955 | A | * | 3/1988 | Honda et al. | 180/296 |
| 5,058,693 | A | * | 10/1991 | Murdock et al. | 180/69.4 |
| 5,371,412 | A | * | 12/1994 | Iwashita et al. | 290/1 R |
| 5,702,125 | A | | 12/1997 | Nakajima et al. | |
| 5,988,145 | A | * | 11/1999 | Horiuchi et al. | 123/519 |
| 6,105,708 | A | | 8/2000 | Amano et al. | |
| 6,575,199 | B1 | * | 6/2003 | Ueda et al. | 138/137 |

FOREIGN PATENT DOCUMENTS

| JP | 02-125422 | | 5/1990 |
| JP | 06-027277 | | 4/1994 |
| JP | 8085353 | | 4/1996 |
| JP | 11-062726 | | 3/1999 |
| JP | 2000-85382 | * | 3/2000 |
| JP | 2001-152839 | * | 6/2001 |
| JP | 2002-192966 | * | 7/2002 |
| JP | 2003-237390 | | 8/2003 |

* cited by examiner

*Primary Examiner*—Frank Vanaman
(74) *Attorney, Agent, or Firm*—Carrier, Blackman & Associates, P.C.; Joseph P. Carrier; William D. Blackman

(57) ABSTRACT

A vehicle having a passenger compartment, an engine arranged at a front end thereof, and a fuel tank arranged under a rear seat and the passenger compartment comprising a canister and an exhaust pipe receiving exhaust gas from the engine and outputting the exhaust gas, wherein the canister and the exhaust pipe are positioned in respective recessed accommodating portions, one of the respective recessed accommodating portions is located between the fuel tank and the engine, and below the passenger compartment.

10 Claims, 6 Drawing Sheets

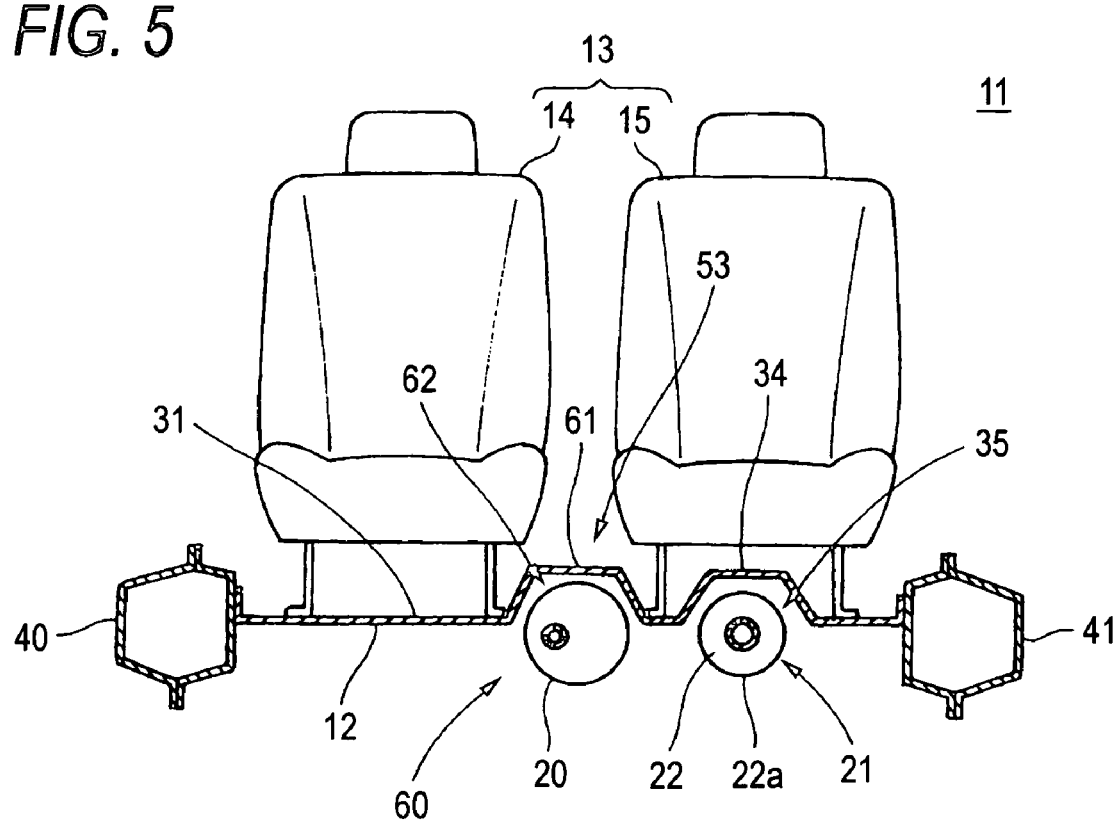
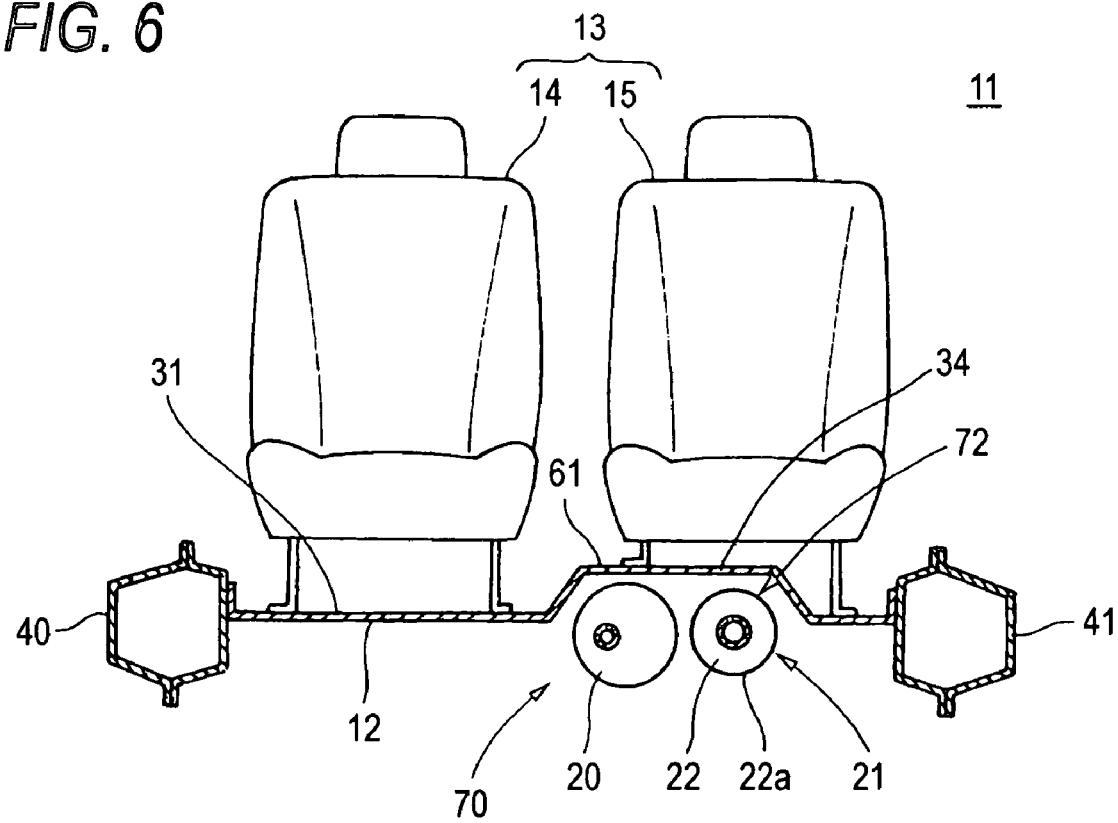

PRIOR ART

VEHICLE CANISTER ARRANGING STRUCTURE

BACKGROUND OF THE INVENTION

1. Field of the Invention

The present invention relates to a vehicle canister arranging structure in which a fuel tank, a canister and an exhaust pipe are arranged under a floor panel constituting a floor surface of a passenger compartment.

2. Description of the Related Art

A canister arranging structure is known in which a fuel tank is provided under a floor surface of an automobile with a canister being provided in a corner location of the fuel tank for example, refer to Japanese Published Patent Application JP-A-11-62726 (page 3, FIG. 1)(U.S. Pat. No. 6,105,708).

The related art will be described in detail by referring to FIG. 1 in JP-A-11-62726 (U.S. Pat. No. 6,105,708).

FIG. 8 is a plan view of the conventional vehicle canister arranging structure. Note that the reference numerals are renewed.

A conventional vehicle canister arranging structure 100 is such that a fuel tank 102 is provided under a floor panel constituting a floor surface of a vehicle 101, a recessed accommodating portion 103 is formed in a front right-hand side corner location of the fuel tank 102, and a canister 104 is accommodated in the recessed accommodating portion 103.

Furthermore, an expansion chamber 106 is provided at a middle of the length of an exhaust pipe 105, and a muffler 107 is provided in the vicinity of a rear end of the exhaust pipe 105.

With the vehicle canister arranging structure 100 described in the JP-A-11-62726 (U.S. Pat. No. 6,105,708), however, the recessed accommodating portion 103 needs to be formed in the front right-hand side corner location of the fuel tank 102 for installing the canister 104.

Thus, the recessed accommodating portion 103 must be formed in the fuel tank 102 and this arranging structure makes the configuration of the fuel tank 102 complicate and makes it difficult to secure a large fuel tank capacity.

SUMMARY OF THE INVENTION

Then, an object of the present invention is to provide a vehicle canister arranging structure which allows an appropriate arrangement of a canister, which can provide a simple fuel tank configuration and which can secure a large fuel tank capacity.

With a view to attaining the object, according to a first aspect of the present invention, a vehicle comprising a passenger compartment, an engine arranged at a front end thereof, a fuel tank arranged under a rear seat and the passenger compartment, a canister and an exhaust pipe receiving exhaust gas from the engine and outputting the exhaust gas, wherein the canister and the exhaust pipe are positioned in respective recessed accommodating portions below the passenger compartment, and one of the respective recessed accommodating portions is located between the fuel tank and the engine.

Here, in the passenger compartment, a space under the driver's seat and a space under the front passenger seat are areas which are usually left as they are. In addition, in particular, with an FF vehicle (a front engine, front drive vehicle), a space situated between the driver's seat and the front passenger seat and in the vicinity of the floor panel is also an area that is usually left as it is.

Then, according to the present invention, a vehicle comprises a reservoir or fuel tank at a first end there of, an engine at a second end thereof, and a passenger compartment between the first end and the second end, a canister receiving fuel at the reservoir and supplying fuel to the engine, and an exhaust pipe receiving exhaust gas from the engine and outputting the exhaust gas to the second end of the vehicle, wherein the canister and the exhaust pipe are positioned in respective recessed accommodating portions, one of the respective recessed accommodating portions is located between the first end and the second end, and below the passenger compartment.

The recessed accommodating portions are located beneath at least one of a first seat, a second seat, and a space between the first and the second seats. The first seat is a driver's seat, and the second seat is front passenger's seat.

By this canister arranging structure, the areas which are usually left as they can be utilized effectively so as to form the recessed accommodating portions for accommodating part of the exhaust pipe and the canister. Thus, part of the exhaust pipe and the canister can be accommodated without deteriorating the riding comfort within the passenger compartment.

Furthermore, by accommodating the canister in the recessed accommodating portion, the necessity is obviated of forming the recessed accommodating portion for accommodating the canister at a portion of the fuel tank, which is an inherent disadvantage in the related art as discussed above.

According to a second aspect of the present invention, the expansion chamber of the exhaust pipe is arranged close to the canister by accommodating the expansion chamber and the canister in at least one of said recessed accommodating portions, so that heat from the exhaust gas in the exhaust pipe is transferred to the canister.

Here, an adsorbent (as an example, activated charcoal granules) is housed in the interior of the canister, so that fuel vapor resulting in the fuel tank from evaporation of fuel when the engine is stopped is adsorbed to the activated charcoal granules, and when the engine is operating under a driving condition, the fuel vapor so adsorbed to the activated charcoal granules is released from the charcoal granules for supply to the engine.

Incidentally, in order to release fuel vapor from activated charcoal granules with good efficiency, it is preferable to keep activated charcoal granules at a certain temperature. Then, according to the second aspect of the present invention, by forming part of the exhaust pipe into the expansion chamber, the expansion chamber can be arranged in the vicinity of the canister. Since the outside diameter of an outer circumference of the expansion chamber is large, a large outer circumferential area can be secured.

Due to this, the heat of exhaust gases flowing through the exhaust pipe can be dissipated from the outer circumference of the expansion chamber with good efficiency, and the heat so dissipated can be conducted to the canister, whereby since activated charcoal granules within the canister can be kept at a certain temperature, fuel vapor can be released from the activated charcoal granules with good efficiency when the engine is operating under a driving condition.

BRIEF DESCRIPTION OF THE DRAWINGS

FIG. 5 is a sectional view of a vehicle provided with a vehicle canister arranging structure (a second embodiment) according to the present invention.

FIG. 6 is a sectional view of a vehicle provided with a vehicle canister arranging structure (a third embodiment) according to the present invention.

DETAILED DESCRIPTION OF THE PREFERRED EMBODIMENTS

Figure 1:
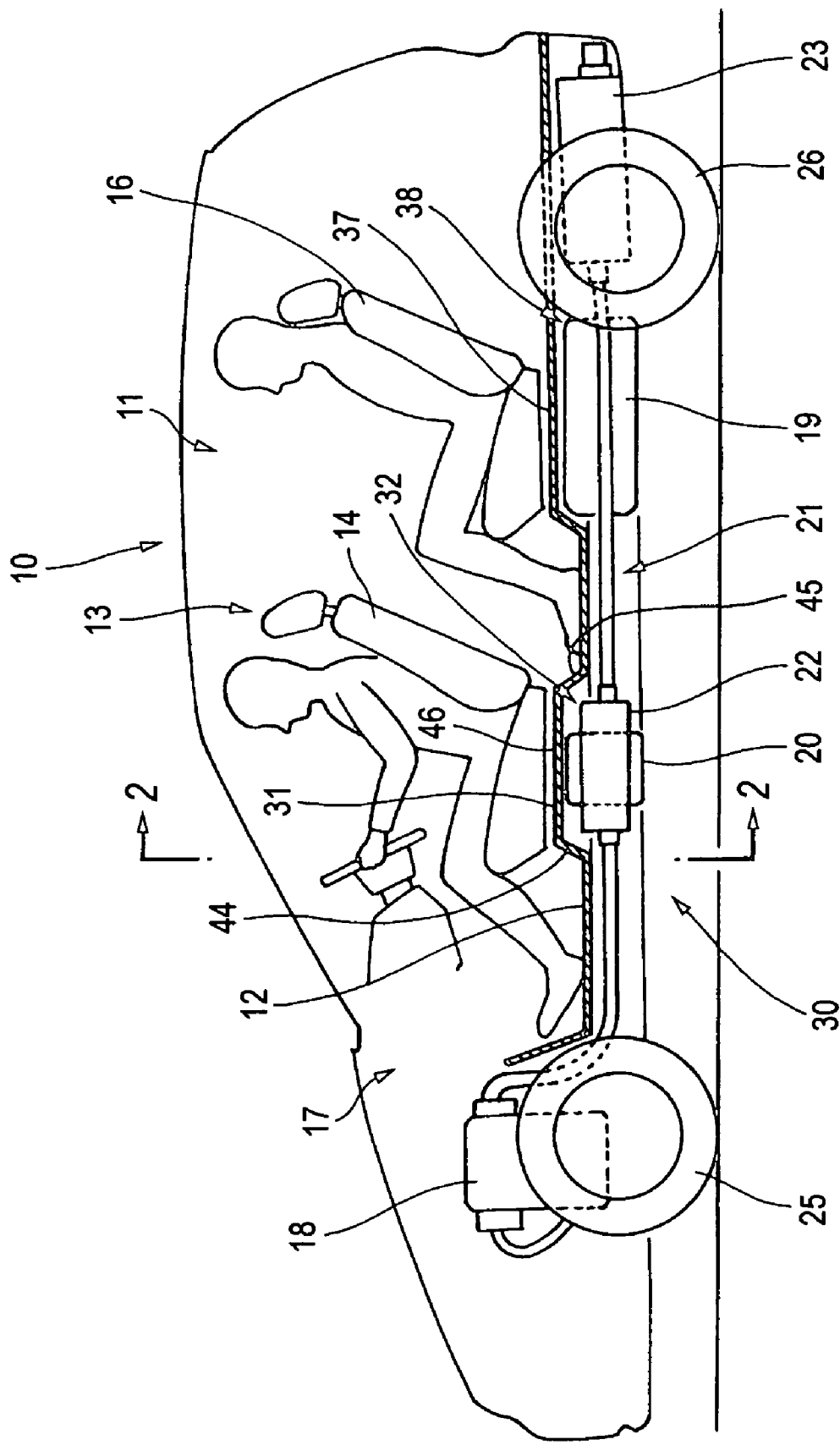
FIG. 1 is an explanatory drawing of a vehicle provided with a vehicle canister arranging structure (a first embodiment) according to the present invention.

Embodiments of the present invention will be described based on the accompanying drawings. Here "front", "rear", "left" and "right" indicate directions as viewed from the driver. Note that the drawings are viewed in a direction in which reference numerals are oriented.

FIG. 1 is an explanatory drawing of a vehicle having a vehicle canister arranging structure (a first embodiment) according to the present invention.

In the following description, the first end is the rear of the vehicle and the second end is the front of the vehicle. The fuel reservoir or tank is arranged under the rear seat. The exhaust pipe constitutes an expansion chamber.

A vehicle 10 is such that a front seat 13 including a driver's seat 14 and a front passenger seat 15 (refer to FIG. 2) and a rear seat 16 are provided in a passenger compartment 11 above a floor panel 12 which constitutes a floor surface of the passenger compartment 11, an engine 18 is installed in an engine compartment 17 situated in front of the passenger compartment 11, and a fuel tank 19, a canister 20 and an exhaust pipe 21 are arranged under the floor panel 12. Note that reference numeral 25 denotes a front wheel and reference numeral 26 denoting a rear wheel.

Hereinafter, an arranging structure of the canister 20, i.e., a vehicle canister arranging structure 30 will be described.

Figure 2:
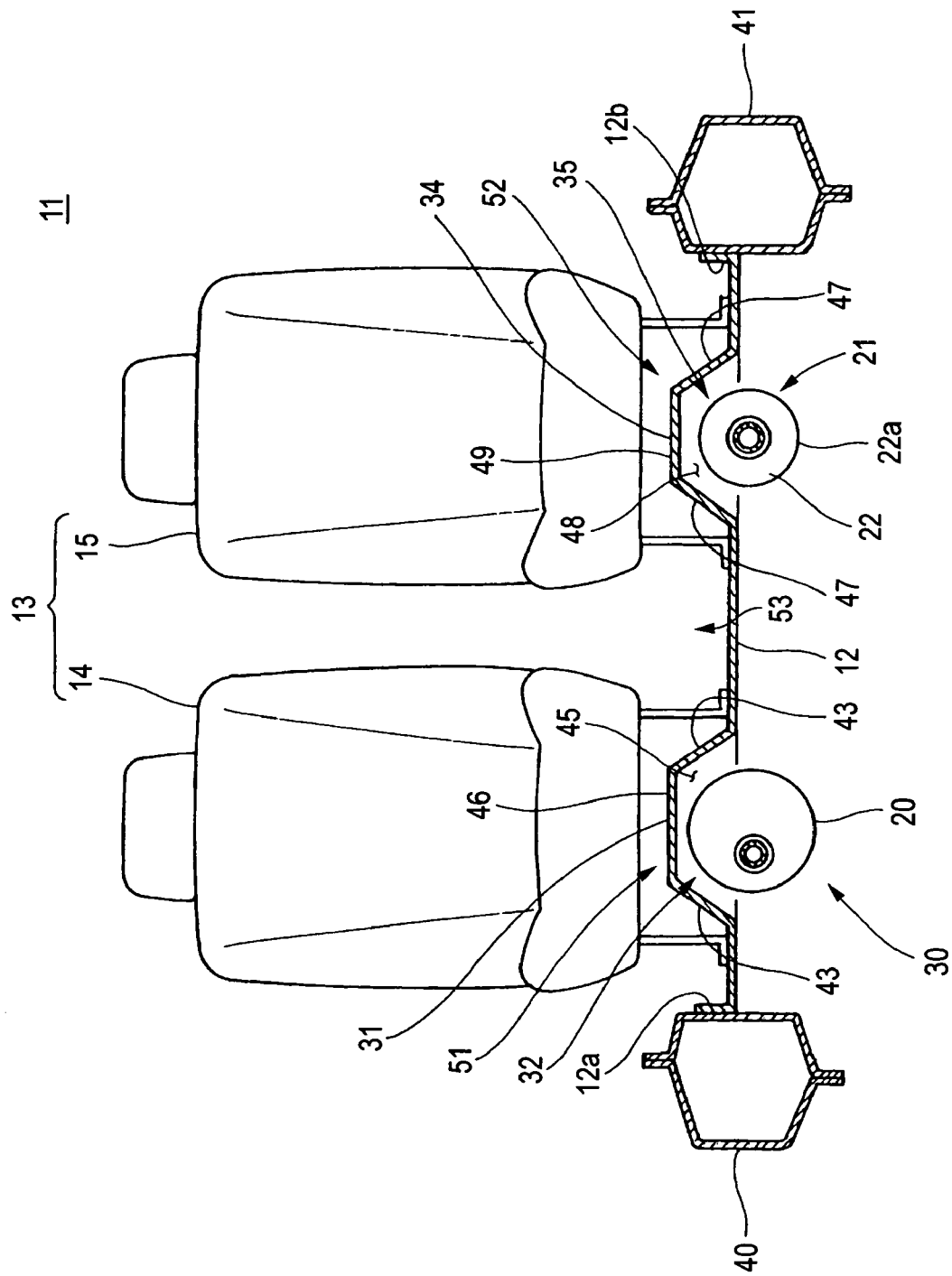
FIG. 2 is a sectional view taken along the line 2-2 of FIG. 1.

In the vehicle canister arranging structure 30 according to one embodiment hereof, a driver's seat location 31 on the floor panel 12 is expanded upwardly toward the passenger compartment 11 so as to be formed into a rectangular shape as viewed from the top, to thereby constitute a first recessed accommodating portion 32, so that the canister 20 is accommodated in this first recessed accommodating portion 32. In addition, a front passenger seat location 34 on the floor panel 12 shown in FIG. 2 is expanded upwardly toward the passenger compartment 11 so as to be formed into a rectangular shape as viewed from the top, to thereby constitute a second recessed accommodating portion 35, so that an expansion chamber 22, which constitutes part of the exhaust pipe 21, is accommodated in the second recessed accommodating portion 35. As illustrated in FIG. 2, each of the driver's seat and the front passenger's seat include a seat support bracket attached to the floor 12 of the passenger compartment 11 at respective left and right support bracket attachment portions of the floor. The support bracket attachment portions define a first level of the floor, and portions of the floor 12 extend upwardly from the first level to define the recessed accommodating portions 32, 35 formed below the floor of the passenger compartment.

Additionally, on the floor panel 12, a location 37 which corresponds to the rear seat 16 and a portion rearward thereof are expanded toward the passenger compartment 11 so as to form a recessed fuel tank accommodating portion 38, so that the fuel tank 19 is accommodated in this recessed fuel tank accommodating portion 38, and a muffler 23 of the exhaust pipe 21 is also accommodated therein.

Note that the expansion chamber 22 is such as to reduce the level of exhaust noise.

FIG. 2 is a sectional view taken along the line 2-2 of FIG. 1.

Side portions 12a, 12b of the floor panel 12 are welded to side sills 40, 41, respectively, and the driver's seat location 31 on the floor panel 12 is expanded toward the passenger compartment 11 so as to be formed into the rectangular shape to thereby constitute the first recessed accommodating portion 32, and the front passenger seat location 34 on the floor panel 12 is expanded toward the passenger compartment 11 so as to be formed into the rectangular shape to thereby constitute the second recessed accommodating portion 35.

The first recessed accommodating portion 32 is formed into substantially the rectangular recessed portion, as viewed from the top, by inclined sidewalls 43, 43 on both sides, inclined front and rear walls 44, 45 (refer to FIG. 1 with respect to the inclined front wall 44 and the inclined rear wall 45) and a ceiling surface 46.

The second recessed accommodating portion 35 is formed into substantially the rectangular recessed portion, as viewed from the top, by inclined sidewalls 47, 47 on both sides, inclined front and rear walls 48 (an inclined front wall is not shown) and a ceiling surface 49.

The canister 20 and the expansion chamber 22 constituting part of the exhaust pipe 21 are accommodated in the first and second recessed accommodating portions 32, 35, respectively.

Here, in the passenger compartment 11, a space 51 under the driver's seat 14, a space 52 under the front passenger seat 15 and a space 53 in the vicinity of the floor panel 12 between the driver's seat 14 and the front passenger seat 15 are usually left as they are and constitute relatively useless areas.

The first and second recessed accommodating portions 32, 35 for accommodating the canister 20 and the expansion chamber 22 are determined to be formed by making effective use of the space 51 under the driver's seat 14, the space 52 under the front passenger seat 15 and the space 53 in the vicinity of the floor panel 12 between the driver's seat 14 and the front passenger seat 15 which are usually left as they are.

Consequently, the canister 20 and the expansion chamber 22 can be accommodated without deteriorating the riding comfort in the passenger compartment 11.

In addition, an adsorbent (as an example, activated charcoal granules) is housed in the interior of the canister 20, so that fuel vapor resulting from evaporation of fuel in the fuel tank 19 (refer to FIG. 1) is adsorbed to the activated charcoal granules when the engine 18 (refer to FIG. 1) is stopped, whereas when the engine 18 is operating under a driving condition, fuel vapor is released from the activated charcoal granules for supply to the engine 18.

The expansion chamber 22 can be arranged relatively close to the canister 20 by accommodating the canister 20 and the expansion chamber 22 in the first and second recessed accommodating portions 32, 35, respectively. Since the outside diameter of an outer circumference 22a of the expansion chamber 22 is large, a large area can be secured on the outer circumference 22a.

Due to this, the heat of exhaust gases flowing through the exhaust pipe 21 can be dissipated from the outer circumference 22a of the expansion chamber 22 with good efficiency, and the heat so dissipated can be conducted to the canister 20.

Since the activated charcoal granules inside the canister 20 can be kept a certain temperature by this construction, fuel vapor can be released from the activated charcoal granules with good efficiency when the engine 18 is operating under a driving condition.

Figure 3:
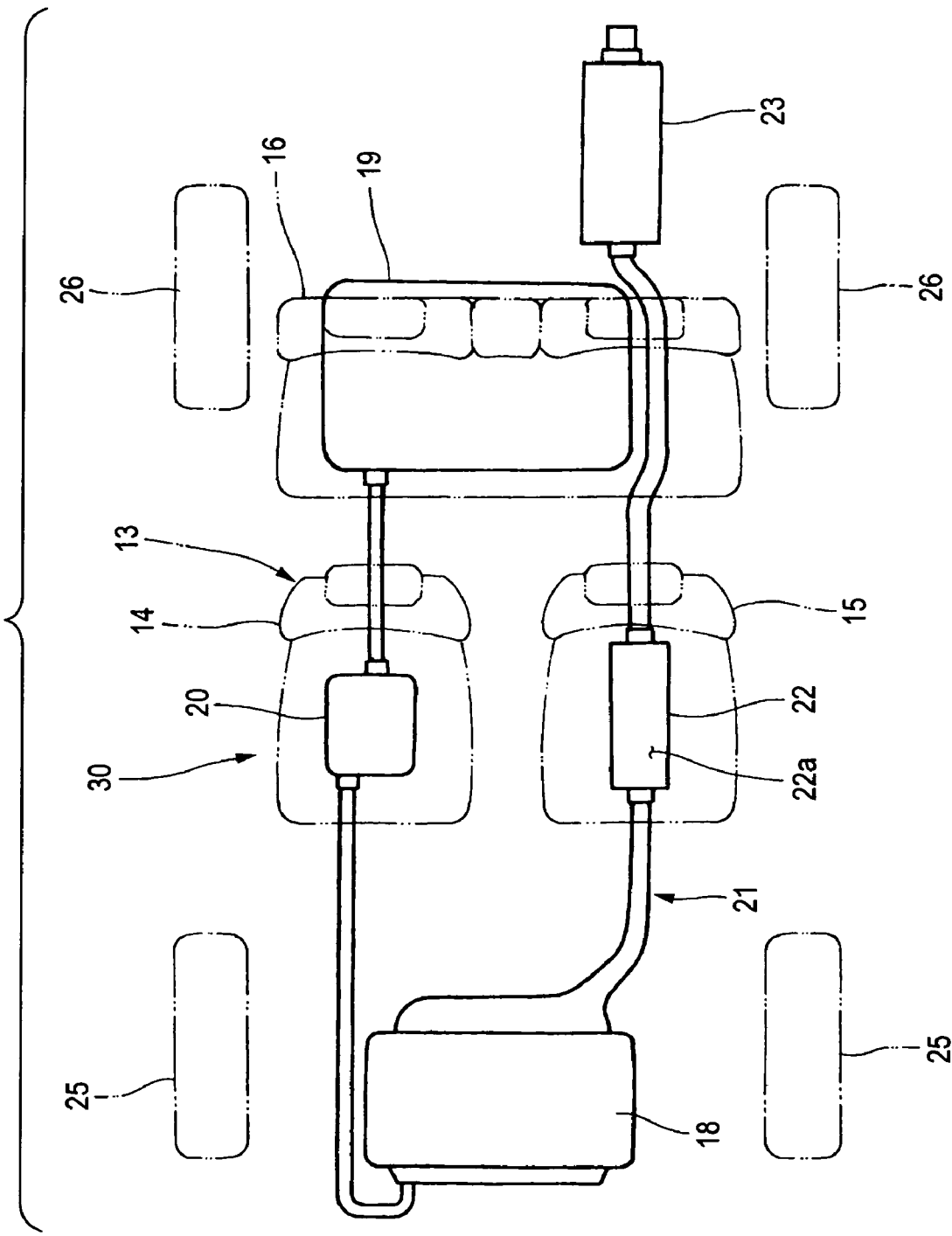
FIG. 3 is a plan view of the vehicle provided with the vehicle canister arranging structure (the first embodiment) according to the present invention.

FIG. 3 is a plan view of a vehicle provided with the vehicle canister arranging structure (the first embodiment) according to the present invention.

The recessed fuel tank accommodating portion 38 (refer to FIG. 1) is formed under the rear seat 16, and the fuel tank 19 and the muffler 23 are accommodated in the recessed fuel tank accommodating portion 38. In addition, the first recessed accommodating portion 32 (refer to FIG. 1) is formed under the driver's seat 14, and the canister 20 is accommodated in the first recessed accommodating portion 32. Furthermore, the second recessed accommodating portion 35 (refer to FIG. 2) is formed under the front passenger seat 15, and the expansion chamber 22 of the exhaust pipe 21 is accommodated in the second recessed accommodating portion 35.

Thus, by arranging the canister 20 under the driver's seat 14, the necessity is obviated of forming the recessed accommodating portion in the fuel tank 19 for accommodating the canister 20, which is inherent in the related art.

Due to this, the configuration of the fuel tank 19 can be simplified substantially to the rectangular box shape, and a large capacity can be secured for the fuel tank 19.

Figure 4A:
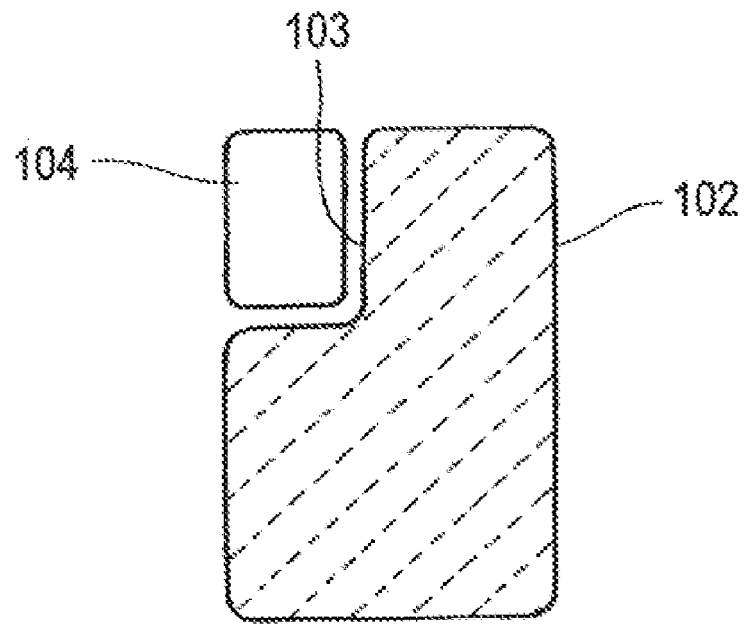
FIG. 4A shows the conventional example of the vehicle canister arranging structure.
Figure 4B:
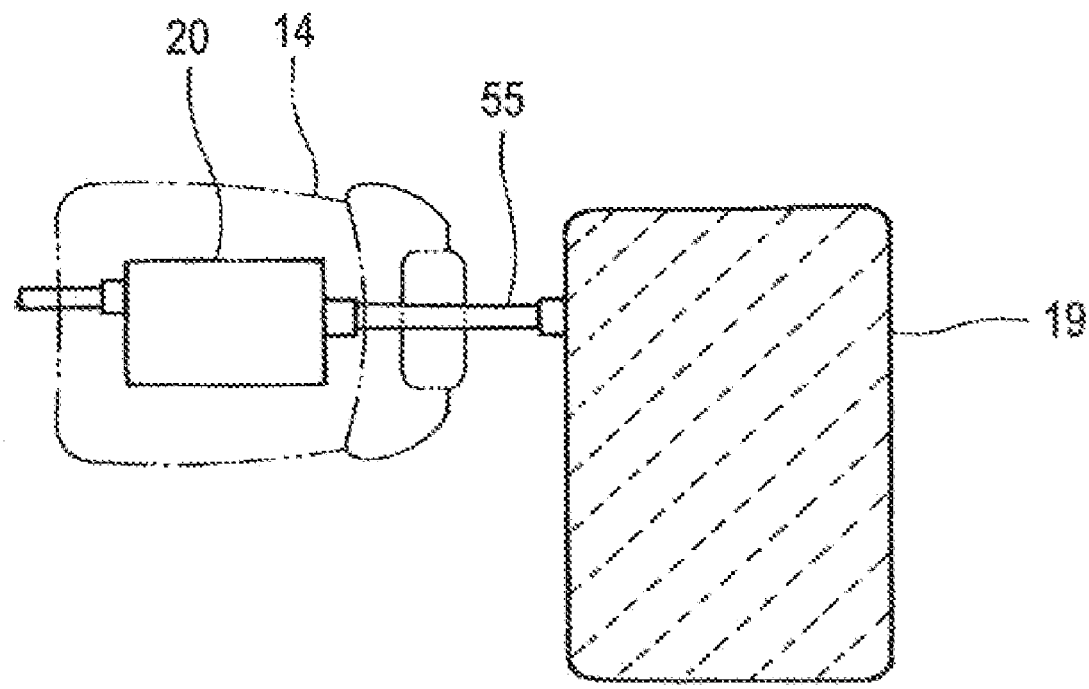
FIG. 4B shows the first embodiment of vehicle canister arranging structure of the present invention.

FIG. 4 shows explanatory drawings for comparing the vehicle canister arranging structure (the first embodiment) according to the present invention with the conventional vehicle canister arranging structure, in which FIG. 4A shows the comparison example, whereas FIG. 4B shows the embodiment of the present invention.

In FIG. 4A, since the canister 104 is arranged in the front right-hand side corner location of the fuel tank 102, the recessed accommodating portion 103 needs to be formed in the front right-hand side corner location of the fuel tank 102.

Thus, since the recessed accommodating portion 103 needs to be formed in the fuel tank 102, the configuration of the fuel tank 102 becomes complicated, and it becomes difficult to secure a large capacity for the fuel tank 102.

Furthermore, since the canister 104 is arranged in the vicinity of the fuel tank 102, a piping layout of pipeline connecting the canister 104 with the fuel tank 102 becomes complicated.

In FIG. 4B, by arranging the canister 20 under the driver's seat 14 according to the present invention, the necessity is obviated of forming the recessed accommodating portion for accommodating the canister 20 in the fuel tank 19, which is inherent in the related art.

Due to this, the configuration of the fuel tank 19 can be simplified substantially to the rectangular box shape, and a large capacity can be secured for the fuel tank 19.

Furthermore, since the canister 20 can be spaced relatively far away from the fuel tank 19, a pipeline 55 for connecting the canister 20 with the fuel tank 19 can be laid out substantially straight, whereby the piping layout can be simplified.

Next, second to fourth embodiments will be described based on FIGS. 5 to 7. Note that in the second to fourth embodiments, like reference numerals are given to like constituent components to those described in the first embodiment.

FIG. 5 is a sectional view of a vehicle provided with a vehicle canister arranging structure (a second embodiment) according to the present invention.

A vehicle canister arranging structure 60 according to a second embodiment of the present invention is such that a front passenger seat location 34 of a floor panel 12 is expanded toward a passenger compartment 11 so as to be formed substantially into a rectangular shape as viewed from the top to thereby constitute a second recessed accommodating portion 35, so that an expansion chamber 22 constituting part of an exhaust pipe 21 is accommodated in the second recessed accommodating portion 35 so formed, and an intermediate location 61 of the floor panel 12 which corresponds to a space between the driver's seat 14 and the front passenger seat 15 is expanded toward the passenger compartment 11 so as to be formed substantially into a rectangular shape to thereby constitute a third recessed accommodating portion 62, so that a canister 20 is accommodated in the third recessed accommodating portion 62.

Here, in an FF vehicle, since a drive shaft (not shown) for transmitting the rotation of the engine 18 to the rear wheel 26, which are both shown in FIG. 1, a space 53 can be secured at the intermediate location 61 which corresponds to the space between the driver's seat 14 and the front passenger seat 15. Consequently, the canister 20 can be accommodated by making use of the space 53.

According to the vehicle canister arranging structure 60, an advantage similar to that of the first embodiment can be obtained.

FIG. 6 is a sectional view of a vehicle provided with a vehicle canister arranging structure (a third embodiment) according to the present invention.

A vehicle canister arranging structure 70 according to a third embodiment of the present invention is such that, of a floor panel 12, any two locations selected from a driver's seat location 31, a front passenger seat location 34, and an intermediate location 61 which corresponds to a space between the driver's seat 14 and the front passenger seat 15, as an example thereof, the front passenger seat location 34 and the intermediate location 61 are expanded together toward a passenger compartment 11 so as to constitute a fourth recessed accommodating portion 72, so that a canister 20 and an expansion chamber 22 constituting part of an exhaust pipe 21 are accommodated in the fourth recessed accommodating portion 72.

According to the vehicle canister arranging structure 70 of the third embodiment, an advantage similar to that of the first embodiment can be obtained.

Figure 7:
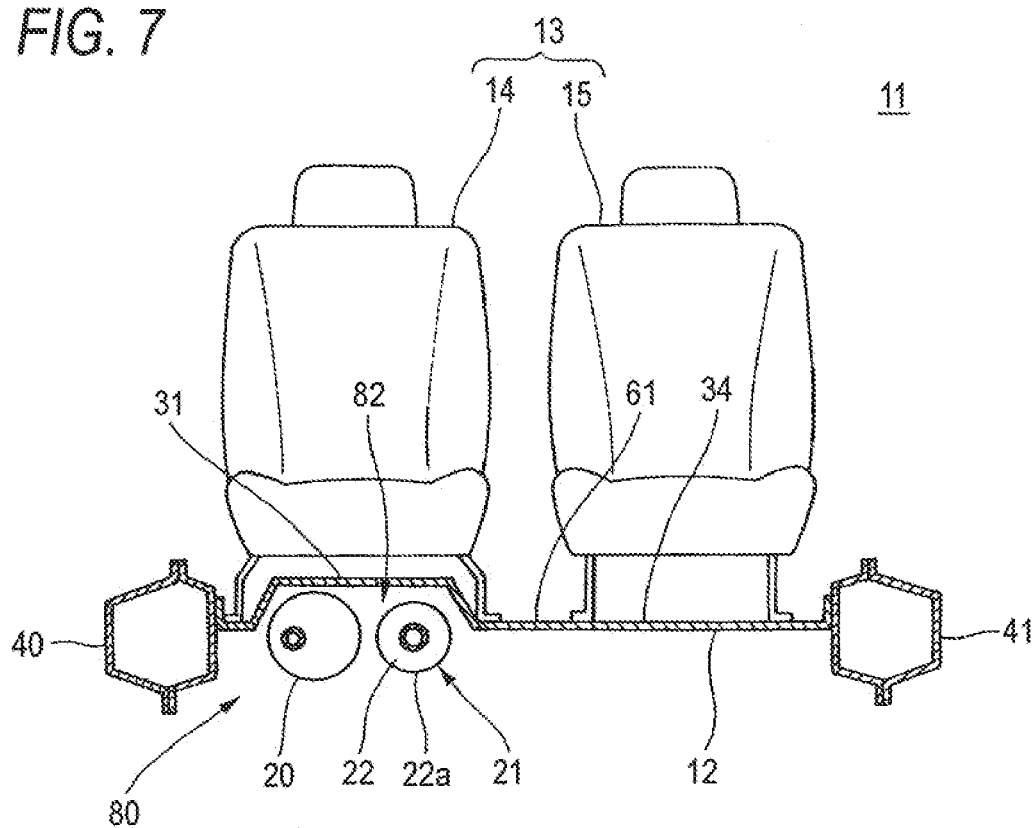
FIG. 7 is a sectional view of a vehicle provided with a vehicle canister arranging structure (a fourth embodiment) according to the present invention.
Figure 8:
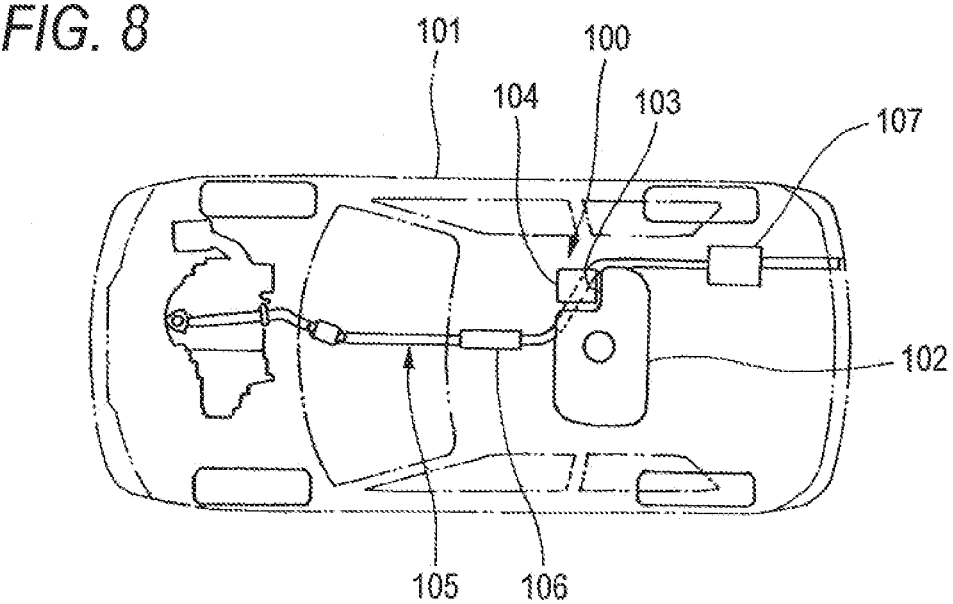
FIG. 8 is a plan view showing a conventional vehicle canister arranging structure.

FIG. 7 is a sectional view of a vehicle provided with a vehicle canister arranging structure (a fourth embodiment) according to the present invention.

A vehicle canister arranging structure 80 according to a fourth embodiment of the present invention is such that a driver's seat location 31 of a floor panel 12 is expanded toward a passenger compartment 11 so as to constitute a fifth recessed accommodating portion 82, so that a canister 20 and an expansion chamber 22 constituting part of an exhaust pipe 21 are accommodated in the fifth recessed accommodating portion 82.

According to the vehicle canister arranging structure 80 of the fourth embodiment, an advantage similar to that of the first embodiment can be obtained.

Note that while, in the first embodiment, the expansion chamber 22 is described as an example of part of the exhaust pipe 21 which is to be accommodated in the recessed accommodating portion, any other portions of the exhaust pipe can be accommodated therein.

While there has been described in detail the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

The present invention exhibits the following advantages from the structures described heretofore.

According to the first aspect of the present invention, the floor panel is expanded toward to the passenger compartment on the location under the driver's seat, the location under the front passenger's seat and the location between the driver's seat and the front passenger's seat, or any two locations selected from the locations, so as to make recessed accommodating portions which accommodate the canister and part of the exhaust pipe.

By this canister arranging structure, the areas which are usually left as they can be utilized effectively so as to form the recessed accommodating portions for accommodating part of the exhaust pipe and the canister. Thus, part of the exhaust pipe and the canister can be accommodated without deteriorating the riding comfort within the passenger compartment.

Furthermore, by accommodating the canister in the recessed accommodating portion, the necessity is obviated of forming the recessed accommodating portion for accommodating the canister in the fuel tank, which is inherent in the related art. Due to this, the configuration of the fuel tank can be simplified, and a large capacity can be secured for the fuel tank.

According to the second and the third aspects of the present invention, the expansion chamber can be arranged in the vicinity of the canister by forming part of the exhaust pipe into the expansion chamber. Since the outside diameter of the outer circumference of the expansion chamber is large, a large outer circumferential area can be secured.

Due to this, the heat of exhaust gases flowing through the exhaust pipe can be dissipated from the outer circumference of the expansion chamber with good efficiency, and the heat so dissipated can be conducted to the canister.

Since this allows the activated charcoal granules within the canister to be kept at a certain temperature, fuel vapor can be released from the activated charcoal granules with good efficiency when the engine is operating under a driving condition.

What is claimed is:

1. A vehicle comprising:
   a passenger compartment having a floor;
   a rear seat disposed in the passenger compartment;
   a driver's seat and a front passenger's seat respectively disposed in the passenger compartment in front of the rear seat, each of the driver's seat and the front passenger's seat comprising a seat support bracket attached to the floor of the passenger compartment at respective left and right support bracket attachment portions of said floor, said support bracket attachment portions defining a first level;
   wherein a portion of said floor extends upwardly from said first level to define at least one recessed accommodating portion formed below the floor of the passenger compartment;
   an engine arranged forward of the passenger compartment at a front end of the vehicle;
   a fuel tank arranged under the rear seat and the passenger compartment;
   a canister for storing and releasing evaporative fuel emissions; and
   an exhaust pipe for receiving exhaust gas from the engine and outputting the exhaust gas during operation of the vehicle;
   wherein the canister and the exhaust pipe are positioned in said at least one recessed accommodating portion,
   and wherein said at least one recessed accommodating portion is located between the fuel tank and the engine.

2. A vehicle as set forth in claim 1,
   wherein the exhaust pipe includes an expansion chamber positioned in said at least one recessed accommodating portion.

3. A vehicle as set forth in claim 2,
   wherein the expansion chamber is arranged close to the canister by accommodating the expansion chamber and the canister in said at least one recessed accommodating portion, so that heat from the exhaust gas in the exhaust pipe is transferred to the canister.

4. A vehicle as set forth in claim 1,
   wherein said at least one recessed accommodating portion is located beneath at least one of the driver's seat, the front passenger's seat, and a space between the driver's seat and the front passenger's seat.

5. A vehicle as set forth in claim 4,
   wherein said at least one recessed accommodating portion comprises two recessed accommodating portions, which are located beneath the driver's seat and the front passenger's seat, respectively.

6. A vehicle as set forth in claim 4,
   wherein said at least one recessed accommodating portion comprises two recessed accommodating portions, which are located beneath the driver's seat and the space between the driver's seat and the front passenger's seat respectively.

7. A vehicle as set forth in claim 1,
   wherein said canister receives fuel from said fuel tank and supplies the fuel to the engine.

8. A vehicle, comprising:
   a passenger compartment having a floor;
   a rear seat disposed in the passenger compartment;
   a driver's seat and a front passenger seat disposed in the passenger compartment;
   an engine arranged forward of the passenger compartment at a front end of the vehicle;
   a fuel tank arranged under the rear seat and the passenger compartment;
   a canister for storing and releasing evaporative fuel emissions; and
   an exhaust pipe for receiving exhaust gas from the engine and outputting the exhaust gas during operation of the vehicle;
   wherein the floor includes an intermediate portion disposed between the driver's seat and the front passenger seat and defining a first level;
   wherein the canister and the exhaust pipe are positioned in respective recessed accommodating portions formed below the floor of the passenger compartment, wherein the recessed accommodating portions are defined by portions of the floor extending upwardly from said first level, and wherein one of the respective recessed accommodating portions is located between the fuel tank and the engine.

9. A vehicle as set forth in claim 8, wherein the exhaust pipe includes an expansion chamber positioned in one of said recessed accommodating portions.

10. A vehicle, comprising:

a passenger compartment having a floor;

a rear seat disposed in the passenger compartment;

a driver's seat and a front passenger seat disposed in the passenger compartment;

an engine arranged forward of the passenger compartment at a front end of the vehicle;

a fuel tank arranged under the rear seat and the passenger compartment;

a canister for storing and releasing evaporative fuel emissions; and an exhaust pipe for receiving exhaust gas from the engine and outputting the exhaust gas during operation of the vehicle;

wherein the floor includes an intermediate portion disposed between the driver's seat and the front passenger seat and defining a first level, wherein the canister and the exhaust pipe are positioned in at least one recessed accommodating portion formed below the floor of the passenger compartment, wherein the at least one recessed accommodating portion is defined by at least one portion of the floor extending upwardly from said first level, wherein said at least one recessed accommodating portion is located between the fuel tank and the engine, and wherein the exhaust pipe includes an expansion chamber which is arranged proximate the canister, so that during operation of the vehicle, some of the heat from the exhaust gas in the exhaust pipe is transferred to the canister.

* * * * *